(12) United States Patent
Iwao et al.

(10) Patent No.: US 11,590,879 B2
(45) Date of Patent: Feb. 28, 2023

(54) VEHICLE LAMP BODY DEVICE

(71) Applicant: HONDA MOTOR CO., LTD., Tokyo (JP)

(72) Inventors: Shunsuke Iwao, Wako (JP); Daisuke Nakashima, Wako (JP); Hiroya Ohkubo, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/668,190

(22) Filed: Feb. 9, 2022

(65) Prior Publication Data

US 2022/0266742 A1    Aug. 25, 2022

(30) Foreign Application Priority Data

Feb. 18, 2021    (JP) .............................. JP2021-024105

(51) Int. Cl.
*B60Q 1/04*    (2006.01)
*F21S 43/245*    (2018.01)
*F21S 43/237*    (2018.01)

(52) U.S. Cl.
CPC .............. *B60Q 1/04* (2013.01); *F21S 43/237* (2018.01); *F21S 43/245* (2018.01)

(58) Field of Classification Search
CPC .......... B60Q 1/04; F21S 43/237; F21S 43/245
See application file for complete search history.

(56) References Cited

U.S. PATENT DOCUMENTS

| 7,946,743 | B2 * | 5/2011 | Natsume | F21S 43/235 362/509 |
| 9,242,594 | B2 * | 1/2016 | Nakada | B60Q 1/0058 |
| 2004/0130904 | A1 * | 7/2004 | Yamada | B60Q 1/2607 362/487 |
| 2017/0089541 | A1 * | 3/2017 | Nakajima | B60Q 1/22 |

FOREIGN PATENT DOCUMENTS

| JP | 2007095615 A | 4/2007 |
| JP | 2017077834 A | 4/2017 |
| JP | 2017-195047 A | 10/2017 |
| JP | 2021005533 A | 1/2021 |

OTHER PUBLICATIONS

Japanese Office Action dated Jun. 28, 2022 issued in corresponding Japanese Application No. 2021-024105 A; English machine translation included (10 pages).

* cited by examiner

*Primary Examiner* — Matthew J. Peerce
(74) *Attorney, Agent, or Firm* — Rankin, Hill & Clark LLP

(57) ABSTRACT

A vehicle lamp body device includes: on an inner side of a long frame body, a lightguide rod; and a light curtain disposed sideways in front of the lightguide rod, in which the light curtain includes a plurality of claw-like parts at an interval in a longitudinal direction.

4 Claims, 5 Drawing Sheets

VEHICLE LAMP BODY DEVICE

INCORPORATION BY REFERENCE

The present application claims priority under 35 U.S.C. § 119 to Japanese Patent Application No. 2021-024105 filed on Feb. 18, 2021. The content of the application is incorporated herein by reference in its entirety.

BACKGROUND OF THE INVENTION

Field of the Invention

The present invention relates to a vehicle lamp body device.

Description of the Related Art

Conventionally, a vehicle is equipped with a vehicle lamp body device such as a position light and a turn light (for example, Japanese Patent Laid-Open No. 2017-195047).

In the vehicle lamp body device of this kind, positions of the position light and the turn light are shifted in up-down and left-right directions in a view from a vehicle front.

SUMMARY OF THE INVENTION

However, in a conventional headlight unit, lamps of different functions are disposed at positions different from each other. Therefore, there has been a risk that design of the headlight unit is limited.

In addition, in the conventional vehicle lamp body device, there is a problem that the plurality of functions of the position light and the turn light or the like cannot be arranged in a space saving manner.

Then, an object of the present invention is to provide a vehicle lamp body device capable of solving the problem that the prior art described above has and arranging the plurality of functions in a space saving manner in a simple configuration.

An aspect for achieving the above-described object is a vehicle lamp body device including: on an inner side of a long frame body, a lightguide rod; and a light curtain disposed sideways in front of the lightguide rod, wherein the light curtain includes a plurality of claw-like parts at an interval in a longitudinal direction.

In addition, in the vehicle lamp body device, surface texturing may be performed on a surface of each of the claw-like parts.

Further, in the vehicle lamp body device, all of the plurality of claw-like parts may have an identical claw length.

In addition, in the vehicle lamp body device, the claw-like parts may be formed such that a claw length on an outer side in a vehicle body width direction is short.

According to the aspect of the present invention, a plurality of functions can be arranged in a space saving manner in a simple configuration.

DETAILED DESCRIPTION OF THE PREFERRED EMBODIMENT

Hereinafter, the present embodiment will be described with reference to the drawings.

In the following description, a front direction of a vehicle is indicated by a sign FR, an upper direction is indicated by a sign UP and a right direction is indicated by RH in figures.

Figure 1:
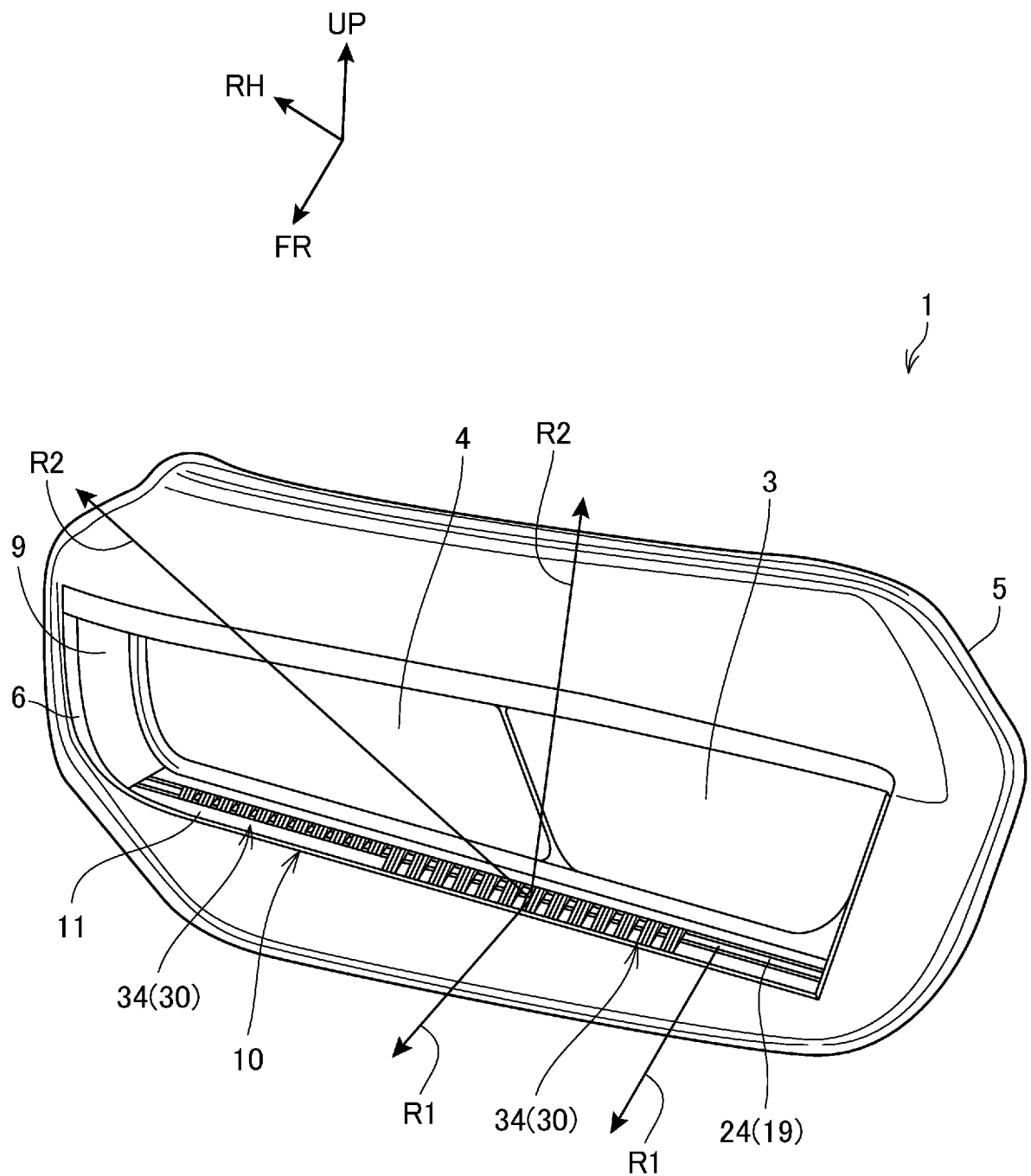
FIG. 1 is a perspective view of a headlight unit relating to a present embodiment.

FIG. 1 is a perspective view of a headlight unit 1 relating to the present embodiment.

The headlight unit 1 corresponds to an example of a vehicle lamp body device. The headlight unit 1 is arranged in bilateral symmetry to a center in a vehicle width direction at a front part of the vehicle. Hereinafter, while the headlight unit 1 on a vehicle right side will be illustrated and described in the present embodiment, the other headlight unit 1 is also similarly configured.

For the headlight unit 1, in a recess 9 provided at the front part of a unit housing 5, a high beam light 3, a low beam light 4 and a lamp unit 10 are arranged. For the high beam light 3, the low beam light 4 and the lamp unit 10, a front surface side is covered with an outer lens 6 fitted to an opening of the recess 9.

The lamp unit 10 is a lamp unit extended over an entire lower edge of the recess 9. Without being limited thereto, the lamp unit 10 may be arranged at any position of the headlight unit 1.

In the present embodiment, the lamp unit 10 also functions as a position lamp.

Figure 2:
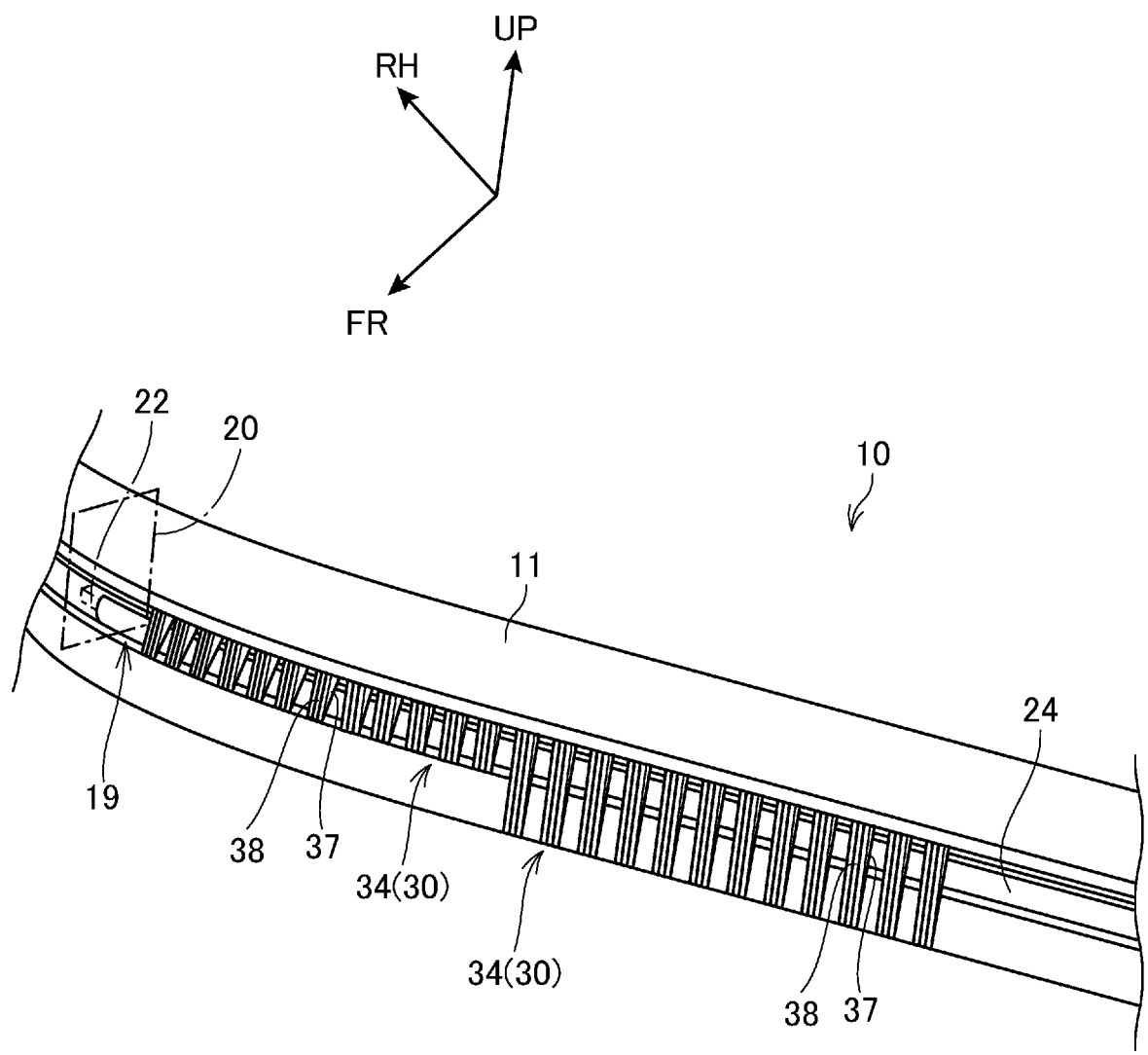
FIG. 2 is a perspective view illustrating a DRL lamp unit.

FIG. 2 is a perspective view illustrating the lamp unit 10.

The lamp unit 10 includes, as illustrated in FIG. 2, a lamp housing 11, a lightguide rod unit 19 and a plurality of light curtain units 30.

Figure 3:
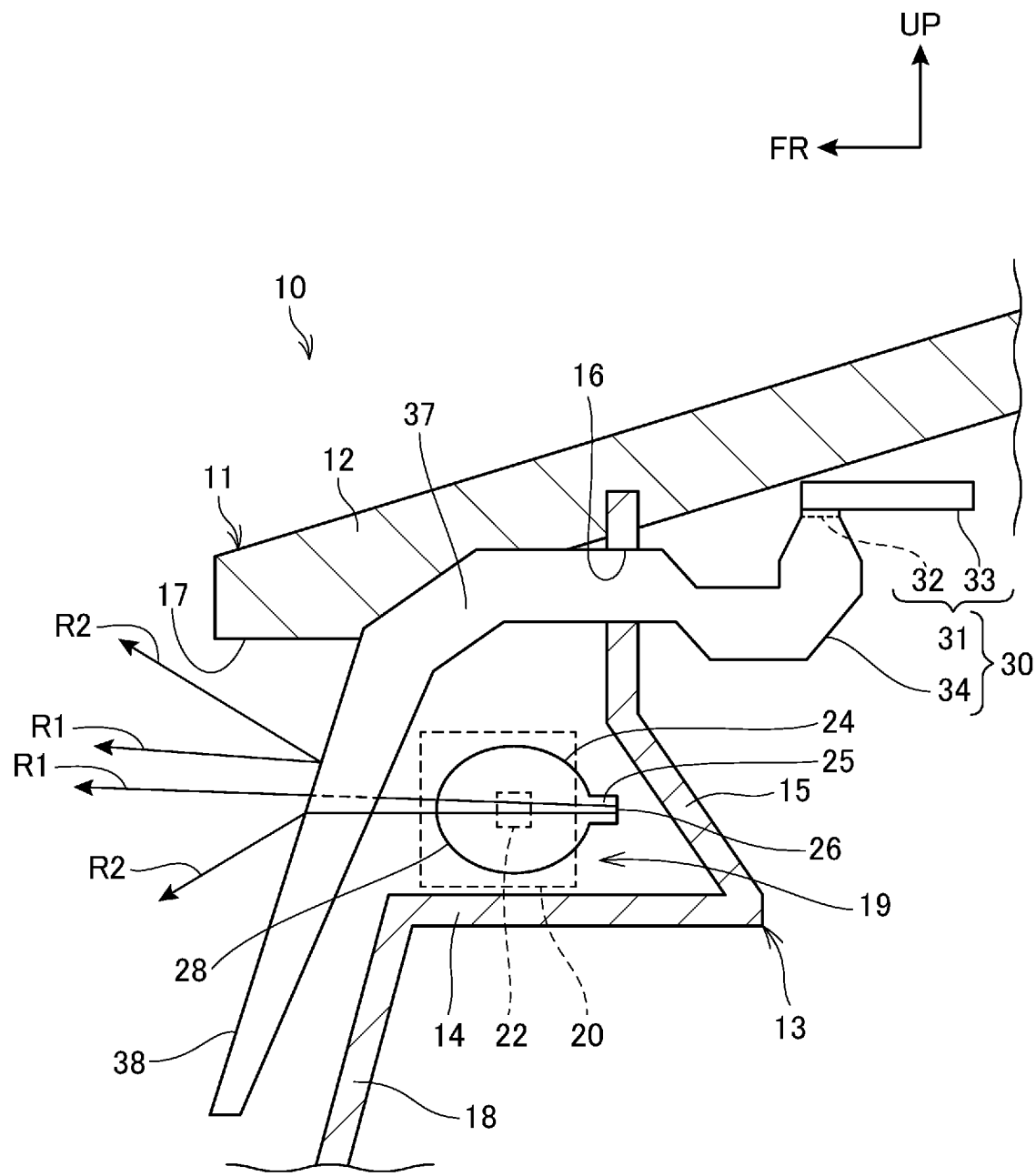
FIG. 3 is a longitudinal sectional view illustrating a schematic configuration of the DRL lamp unit.

FIG. 3 is a longitudinal sectional view illustrating a schematic configuration of the lamp unit 10.

The lamp housing 11 is, as illustrated in FIG. 3, a frame body which surrounds a space inside of which the lightguide rod unit 19 is housed and is formed in a long length extending over the entire lower edge of the recess 9. The lamp housing 11 is provided with an opening part 17 opened to the front surface side of the vehicle over the entire longitudinal direction of the lamp housing 11.

The lamp housing 11 is formed of a top surface panel 12 forming a top surface of the lamp housing 11 and a bottom surface panel 13 forming a bottom surface and a back surface of the lamp housing 11.

The bottom surface panel 13 is formed roughly in an N shape on a cross section, and includes a bottom part 14, a wall part 15 and an edge part 18.

The bottom part 14 is formed by being extended in a width direction along a front-back direction of the vehicle, and forms the bottom surface of an inner space provided in the lamp housing 11. The wall part 15 is raised upwards from a rear end of the bottom part 14 along a vehicle height direction of the vehicle. An upper end of the wall part 15 is connected to a lower surface of the top surface panel 12. In addition, an insertion hole 16 which is a through-hole is provided on a position close to the top surface panel 12 of the wall part 15.

The edge part 18 is formed by being extended downwards from a front end of the bottom part 14 along the vehicle height direction of the vehicle, and forms a front surface on a lower edge side of the lamp housing 11.

In the lamp housing 11, the space surrounded by the top surface panel 12, the bottom part 14 of the bottom surface panel 13 and the wall part 15 is formed, and the lightguide rod unit 19 is housed in the space. That is, the lamp housing 11 has a roughly U shape on the cross section formed by the top surface panel 12, the bottom part 14 of the bottom surface panel 13 and the wall part 15.

The lightguide rod unit 19 includes an LED unit 20 and a lightguide rod 24.

The LED unit 20 is a light emitting element unit including an LED 22 of a COB (Chips on Board) type or an SMD (Surface Mount Device) type for example and a drive circuit which drives the LED 22.

The LED unit 20 is housed in the inside of a sidewall positioned on a right side of the vehicle of the recess 9, in the unit housing 5.

The lightguide rod 24 is a long member which is formed of a transparent resin for example and the cross section of which is roughly circular. The lightguide rod 24 is a lightguide body so called a lightguide which guides light made incident on one end to the other end by internal reflection.

The lightguide rod 24 has a length dimension longer than the lower edge of the recess 9, and is almost entirely housed in the lamp housing 11. Both ends of the lightguide rod 24 are inserted to the inside of the side walls positioned in the vehicle width direction of the recess 9.

To the end positioned on the right side of the vehicle of the lightguide rod 24, the LED 22 is attached in the inside of the side wall of the recess 9.

Thus, by reflecting the light emitted from the LED 22 in the inside, the lightguide rod 24 guides the light over the entire length of the lightguide rod 24. That is, the lightguide rod 24 includes an optical path in the inside.

The lightguide rod 24 is provided with a projection 25 projected towards the wall part 15 over the entire longitudinal direction. The projection 25 is provided with a reflection surface 26 on a position facing the wall part 15. The reflection surface 26 is a plane positioned on a side opposite to the surface positioned on the side of the opening part 17, in the lightguide rod 24.

The reflection surface 26 is provided with a plurality of notched structures such as V-shaped grooves and gratings to be a prism cut for example. The light emitted from the LED 22 and guided by the lightguide rod 24 is reflected at an angle smaller than a critical angle to a surface facing the opening part 17 by being reflected on the reflection surface 26. Thus, the light emitted from the LED 22 is emitted from the surface facing the opening part 17. Hereinafter, the surface facing the opening part 17 is referred to as an emission surface 28.

In the present embodiment, the light emitted from the lightguide rod 24 is radiated toward the front of the vehicle. Hereinafter, the light emitted from the lightguide rod 24 is referred to as main distributed light R1.

In this way, the lightguide rod unit 19 which emits the main distributed light R1 functions as a DRL (Daytime Running Lamp) for daytime lighting and a position lamp.

Each light curtain unit 30 is, as illustrated in FIG. 3, attached to the lamp housing 11. Each of the light curtain units 30 includes an LED unit 31 and a claw-like light curtain 34.

The LED unit 31 is, similarly to the LED unit 20, a light emitting element unit including an LED 32 and a circuit board 33 where a drive circuit which drives the LED 32 is mounted.

Each LED unit 31 is arranged on a back surface of the wall part 15 with the LED 32 facing downwards.

Note that each light curtain unit 30 may share one circuit board 33 and includes each of the plurality of LEDs 32 mounted on the circuit board 33.

Figure 4:
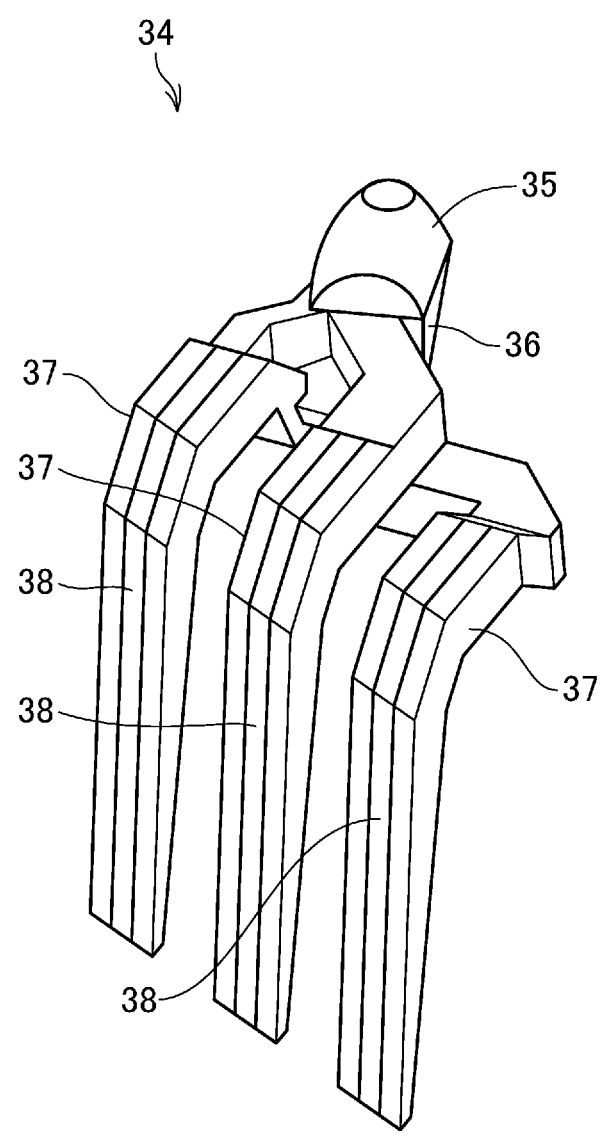
FIG. 4 is a perspective view illustrating a claw-like light curtain.

FIG. 4 is a perspective view illustrating the claw-like light curtain 34.

The claw-like light curtain 34 is housed in the lamp housing 11.

The claw-like light curtain 34 is, similarly to the lightguide rod 24, a lightguide member so called a lightguide which guides the light made incident on one end to the other end by the internal reflection.

As illustrated in FIG. 4, the claw-like light curtain 34 includes a lens part 35, a reflection part 36 and a plurality of claw-like parts 37.

Figure 5:
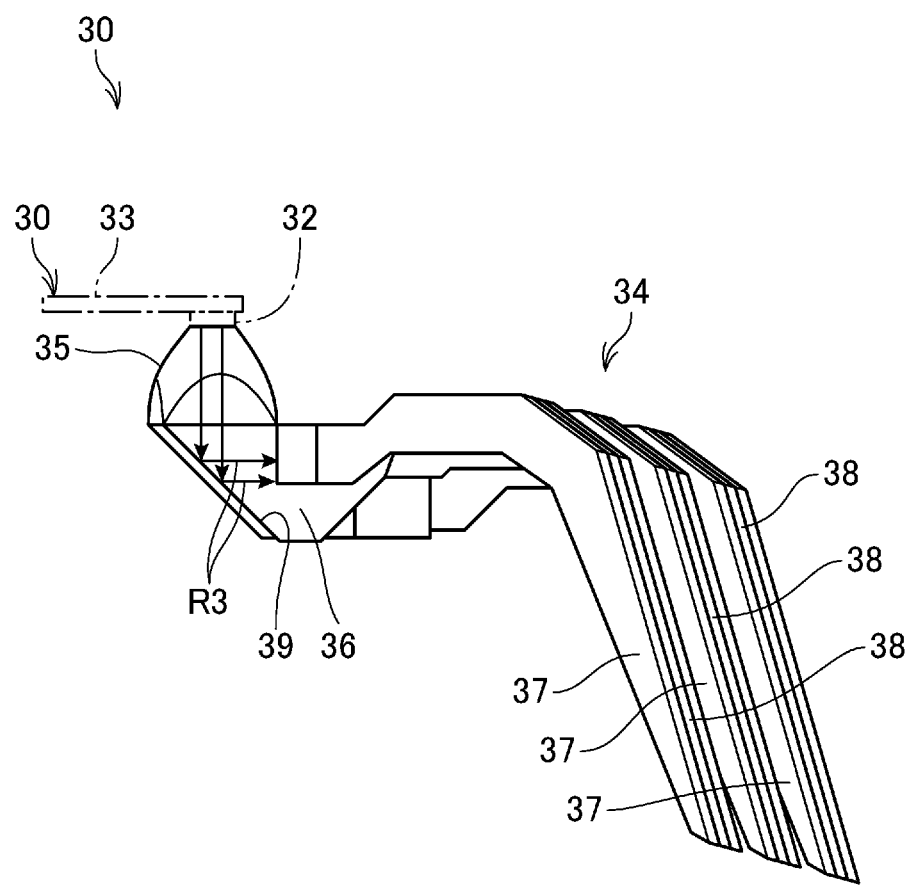
FIG. 5 is a side view illustrating a light curtain unit.

FIG. 5 is a side view illustrating the light curtain unit 30.

As illustrated in FIG. 5, the lens part 35 is arranged at an upper end of the claw-like light curtain 34 and is formed roughly in a dome shape. To a peak part of the lens part 35, the LED 32 is connected.

The lens part 35 is formed to be a collimator lens as a whole. Therefore, the light emitted from the LED 32 connected to the lens part 35 is turned to parallel light and guided to a lower part of the lens part 35 by the lens part 35.

The reflection part 36 is connected to the lower part of the lens part 35. The reflection part 36 is provided with a reflection surface 39 facing the lens part 35.

The reflection surface 39 is provided with notched structures similarly to the reflection surface 26. Emitted light R3 emitted from the LED 32 and guided to the claw-like light curtain 34 is reflected on the reflection surface 39 of each reflection part 36.

The plurality of claw-like parts 37 are formed in a claw shape branched from the reflection part 36 respectively. In the present embodiment, each claw-like light curtain 34 is provided with three claw-like parts 37. Without being limited thereto, each claw-like light curtain 34 may be provided with an arbitrary number of the claw-like parts 37.

Each claw-like part 37 has a shape of being extended in a roughly horizontal direction from the reflection part 36 and then curved downwards. In addition, each claw-like part 37 is arranged at an interval from each other.

In the claw-like light curtain 34, the emitted light R3 emitted from the LED 32 and guided by the lightguide rod 24 is guided by each claw-like part 37 and then emitted from an upper surface 38. That is, each claw-like part 37 functions as an emission piece of the light from the claw-like light curtain 34, and each upper surface 38 functions as an emission surface of the light from the claw-like light curtain 34.

On the entire upper surface 38 of each of the claw-like parts 37, surface texturing is performed.

Thus, the light emitted from the LED 32 passes through the respective parts of the claw-like light curtain 34 and is then emitted from the upper surface 38 in a state of being scattered by the upper surface 38. That is, the upper surface 38 functions as a scattering surface which scatters the light emitted from the LED 32.

Note that, without being limited thereto, the scattering surface may be formed on the upper surface 38 by other surface treatment such as satin finish and notched structure formation.

Next, an arrangement configuration of the claw-like light curtain 34 will be described.

The claw-like light curtain 34 is attached to the lamp housing 11 by inserting the part extended in the horizontal direction of each claw-like part 37 to the insertion hole 16.

Thus, the lens part 35 is arranged on a back surface side of the wall part 15 and the claw-like part 37 is arranged on the side of the opening part 17.

Specifically, the part extended in the horizontal direction of the claw-like part 37 passes through an upper part of the lightguide rod 24 housed in the lamp housing 11, and the part curved downwards of the claw-like part 37 is arranged so as to be bridged to the opening part 17 with the upper surface 38 turned to an outer part of the opening part 17.

That is, the part curved downwards of the claw-like part 37 is arranged at the front part of the emission surface 28 of the lightguide rod 24, and is arranged so as to overlap with a part of the lightguide rod 24 in a front surface view of the lamp unit 10.

The upper surface 38 arranged in such a manner looks like a strip shape extending along the vehicle height direction in the front surface view of the lamp unit 10.

In the present embodiment, the plurality of claw-like light curtains 34 are aligned along the longitudinal direction of the lamp housing 11.

Thus, the individual upper surfaces 38 are aligned along the opening part 17 at a predetermined interval.

Note that, in the present embodiment, the claw-like light curtains 34 in which the part curved downwards of the claw-like part 37 is roughly the same as an opening width of the opening part 17 and the claw-like light curtains 34 in which the part curved downwards of the claw-like part 37 is longer than the opening width of the opening part 17 are used. That is, the plurality of claw-like light curtains 34 having the claw-like parts 37 of different claw lengths are combined and used.

Among the individual claw-like light curtains 34, the ones in which the part curved downwards of the claw-like part 37 is roughly the same as the opening width of the opening part 17 are aligned and arranged on the right side in the vehicle width direction.

In addition, the claw-like parts 37 of a shorter claw length are arranged at positions closer to the lightguide rod 24 than the claw-like parts 37 of a longer claw length.

As described above, the light emitted from the LED 32 is guided by the claw-like light curtains 34 and then emitted from the individual upper surfaces 38. The light emitted from the individual upper surfaces 38 is scattered and some turns to the direction roughly the same as the main distributed light R1. In addition, the other light emitted from the individual upper surfaces 38 is radiated in the vehicle width direction, the vehicle height direction and a direction for which the directions are combined for example. Hereinafter, the light which turns to the direction different from the main distributed light R1 is referred to as viewing angle distributed light R2.

In this way, the light curtain unit 30 which emits the main distributed light R1 and the viewing angle distributed light R2 functions as a turn lamp that is a direction indicator.

Namely, in the lamp unit 10, the plurality of lamps having functions different from each other are arranged.

On the claw-like light curtains 34 and the lightguide rod 24, mutually different coloring may be performed. Thus, the DRL lamp formed of the lightguide rod unit 19 and the turn lamp formed of the light curtain unit 30 may have light colors different from each other.

Without being limited thereto, by using the LED 22 and the LED 32 having the light colors different from each other, the DRL lamp formed of the lightguide rod unit 19 and the turn lamp formed of the light curtain unit 30 may have the light colors different from each other.

As described above, the individual upper surfaces 38 are arranged at the front of the lightguide rod 24 in a view from a vehicle front.

Therefore, some of the light emitted from the lightguide rod 24 is made incident on the back surface of the claw-like parts 37 and is then emitted from the upper surfaces 38. As described above, the light emitted from the individual upper surfaces 38 is scattered such that some turns to the direction roughly the same as the main distributed light R1. Of the light emitted from the individual upper surfaces 38, some is radiated as the main distributed light R1 and the rest is radiated as the viewing angle distributed light R2.

Thus, in the present embodiment, for the light of the DRL lamp formed of the lightguide rod unit 19, some transmitted through the claw-like parts 37 is radiated as the viewing angle distributed light R2. Therefore, a range in which the light of the lightguide rod unit 19 is visually recognizable, that is an irradiation range of the lightguide rod unit 19, can be enlarged.

Next, an effect of the present embodiment will be described.

The headlight unit 1 relating to the present embodiment is provided with the lamp unit 10. The lamp unit 10 includes the lightguide rod unit 19 which functions as the DRL lamp and a light curtain unit 30 which functions as a turn lamp. That is, in the headlight unit 1, ay an arranged part of the lamp unit 10, the lamps having the functions different from each other are provided.

Thus, in the headlight unit 1, the plurality of lamps having the functions different from each other can be arranged in one space. Therefore, in the headlight unit 1, design can be improved.

In addition, the lightguide rod 24 of the lightguide rod unit 19 integrally includes the reflection surface 26, and guides the light emitted from the LED 22. Further, the claw-like light curtain 34 of the light curtain unit 30 integrally includes the reflection surface 39 and guides the light emitted from the LED 32.

Thus, the lightguide rod unit 19 and the light curtain unit 30 efficiently emit the light without being provided with other optical members, and function as the DRL lamp or the turn lamp. Therefore, the headlight unit 1 can achieve space saving and can improve light emission efficiency.

In the headlight unit 1, the emission surface 28 which is a light emitting surface of the lightguide rod unit 19 is arranged so as to overlap with the back of the upper surface 38 which is the light emitting surface of the light curtain unit 30.

Therefore, when the lightguide rod unit 19 emits the light, from the headlight unit 1, the main distributed light R1 emitted through between the claw-like parts 37 and the viewing angle distributed light R2 transmitted through the claw-like parts 37 are radiated.

Thus, for the lightguide rod unit 19, different light emitting surfaces are visually recognized depending on an angle of viewing the lightguide rod unit 19 and the headlight unit 1.

For example, in the case of viewing the headlight unit 1 from the front, for the light emitting surface of the DRL lamp, a linear light emitting surface in roughly the same shape as the emission surface 28 is visually recognized.

On the other hand, for example, in the case of viewing the headlight unit 1 from a position shifted to either side in the vehicle width direction of the vehicle, the main distributed light R1 is not visually recognized easily and the viewing angle distributed light R2 is visually recognized mainly.

That is, the individual upper surfaces 38 are visually recognized as the light emitting surface.

Thus, for example, a person around the vehicle such as a pedestrian can visually recognize the arrangement of the vehicle or an advancing direction of the vehicle according to the shape of the light emitting surface of the DRL lamp.

In addition, accordingly, since the lamp unit 10 includes the light curtain unit 30 which functions as the turn lamp, the DRL lamp which emits the light in a striped pattern can be provided without using other optical members such as a light shielding plate and a reflector.

As described above, according to the present embodiment, the headlight unit 1 includes the lightguide rod 24 and the claw-like light curtain 34 disposed sideways in front of the lightguide rod 24 on the inner side of the long lamp housing 11. Then, the claw-like light curtain 34 includes the plurality of claw-like parts 37 at an interval in the longitudinal direction.

Accordingly, in the headlight unit 1, the plurality of lamps having the functions different from each other can be arranged in one space. Therefore, in the headlight unit 1, the design can be improved.

In addition, according to the present embodiment, each claw-like part 37 is provided with the upper surface 38 that is the scattering surface which scatters the light transmitted through the claw-like light curtain 34.

Accordingly, the light transmitted through the claw-like parts 37 is radiated in a wider range. Therefore, the range in which the light emitted from the lamp unit 10 is visually recognizable can be enlarged.

Further, according to the present embodiment, the claw-like parts 37 are formed such that the claw length on an outer side in the vehicle body width direction is short.

Thus, the design of the light emitting surface of the lamp unit 10 can be improved.

The embodiment described above illustrates one aspect of the present invention and arbitrary modifications and applications are possible without deviating from the gist of the present invention.

In the embodiment described above, the claw-like parts 37 are formed such that the claw length on the outer side in the vehicle body width direction is short. However, without being limited thereto, the claw-like parts 37 having the same claw length may be aligned over the entire vehicle body width direction.

Thus, in a case where only the lamp unit 10 is lighted, the linear light emitting surface in roughly the same shape as the emission surface 28 more clearly surfaces over the entire light emitting surface of the lamp unit 10. Therefore, clearer striped patterns are formed on the light emitting surface of the DRL lamp when the DRL lamp is lighted and visibility of the DRL lamp can be improved.

REFERENCE SIGNS LIST

1 Headlight unit
10 Lamp unit
11 Lamp housing
17 Opening part
19 Lightguide rod unit
24 Lightguide rod
30 Light curtain unit
34 Claw-like light curtain (light curtain)
37 Claw-like part
38 Upper surface (surface)

What is claimed is:

1. A vehicle lamp body device comprising:
a long frame body having an opening part;
a lightguide rod which extends in a longitudinal direction, of the opening part;
a first light source,
wherein the lightguide rod guides light that is emitted from the first light source and that is incident on one end of the lightguide rod; to an other end of the lightguide rod by internal reflection,
wherein the lightguide rod includes an emission surface that is provided at a side of the opening part and emits the light; and
a plurality of light curtains, each of which is a lightguide disposed at the side of the opening part with respect to the lightguide rod, and which are separated from each other in the longitudinal direction of the lightguide rod,
wherein the plurality of light curtains each include a claw-like part,
wherein each claw-like part extends in a intersect direction intersecting the longitudinal direction of the lightguide rod,
each claw-like part guides, in the intersect direction, light that is incident from a second light source provided at one end of the claw-like part, to an other end of the claw-like part by internal reflection, the second light source being different from the first light source,
the claw-like parts are disposed at an interval in the longitudinal direction of the lightguide rod,
each claw-like part includes an emission surface that is provided at the side of the opening part and that emits the light from the second light source, and the emission surface of each claw-like part overlaps with the emission surface of the lightguide rod from the side of the opening part.

2. The vehicle lamp body device according to claim 1, wherein surface texturing is performed on a surface of the claw-like part of each of the plurality of light curtains.

3. The vehicle lamp body device according to claim 1, wherein the claw-like parts of the plurality of light curtains all have an identical length in the intersect direction.

4. The vehicle lamp body device according to claim 1, wherein the claw-like part of each of the plurality of light curtains is formed such that a length, in the intersect direction, of the claw-like part on an outer side in the longitudinal direction of the lightguide rod is shorter than the length, in the intersect direction, of the claw-like part on an inner side in the longitudinal direction of the lightguide rod.

* * * * *